3,187,423
METHOD OF RELEASING SOLID SOLDER
FROM A JOINT
Lloyd C. Lantz, P.O. Box 391, North Sydney,
Nova Scotia, Canada
No Drawing. Filed Jan. 4, 1962, Ser. No. 164,387
9 Claims. (Cl. 29—427)

This application relates to the release of solder from surfaces to which it has adhered. In particular, it relates to compositions containing mercury, tin and lead, to the use of these compositions in a method of releasing tin-lead solder and to methods of making the compositions.

Broadly, the invention contemplates an alloy of mercury, tin and lead and a method of releasing solder from surfaces to which it has adhered which comprises melting the solder in contact with a piece of the alloy and dislodging the resulting composition just as it solidifies or after it has solidified.

It is the primary object of the present invention to provide for the simple, rapid and effective loosening and removal of solder from surfaces without damage to the soldered parts and without contaminating surrounding parts with spattered solder.

It is a further object of the present invention to provide an alloy of tin, lead and mercury of specific proportions and compositions containing same which are useful in releasing solder from surfaces to which it has adhered.

It is a still further object to provide a method of releasing tin-lead solder from a soldered connection which includes heating an alloy of tin, lead and mercury in contact with the connection to melt the alloy and the solder and thereby form a composition which can be simply, rapidly, and completely removed from the parts of the connection.

Soldered connections such as those used in assembling electronic parts, are conventionally loosened and the solder removed by the simple expedient of applying a heated soldering iron to the connection to melt the solder and brushing, shaking or scraping the softened solder from the parts of the connection. As is known, in changing from a liquid to a solid, conventional solder passes rapidly through a "rotten" or pulpy stage during which it will crumble easily if mechanically disturbed. In practice this rotten stage is recognized as occurring at the moment when the molten solder, which has a bright, shiny appearance, takes on a dull appearance. At this instant, one skilled in soldering technique will be able to dislodge substantially all the solder from the joint leaving the parts of the connection free of each other and substantially free of solder. The rotten solder that has been dislodged does not contaminate surrounding parts because it is substantially a solid and consequently will not spatter or cling to other surfaces.

The recognition of the rotten solder stage and the removal of same from large connections between, for example, heavy gauge wires in a radio, is not difficult. However, when the connection is small, the small amount of solder present passes through the rotten condition so rapidly that the advantages which this condition usually presents cannot be utilized. It is often necessary to apply the soldering iron several times in order to effect removal of all the solder from the pieces. This procedure not only consumes time but also is likely to contaminate surrounding parts with spattered solder with each application of the iron.

In removing parts from printed circuits which are now in wide use in the construction of transistor radios and television sets the above problems are magnified due to the very small connections which must be loosened. Further, some of the parts in such circuits have as many as six connections thereto. Since only one joint can usually be heated at one time, there is much bending, twisting and burning of the part and the printed circuit board during the repeated application of the soldering iron.

It is apparent, therefore, that part removal by conventional techniques, especially from such devices as miniature transistor radios, is extremely difficult and can rarely be effected without damage to the part or to the device or to both. When the part is to be removed for testing, with the intention of replacing same, the disadvantages of damaging the part or the remainder of the device are obvious.

It has been found that soldered joints may be easily loosened without the above-mentioned disadvantages by melting the solder in contact with an alloy of tin, lead and mercury of rather specific proportions and by dislodging the resulting composition either in the rotten condition or after solidification. The molten mixture of alloy and solder passes slowly through the rotten stage which conventional solder passes through rapidly and even after solidification, the mixture is easily dislodged.

The alloy used herein will usually consist essentially of from 45% to 60% mercury by weight with the balance being tin and lead. In this connection, it has been found that an alloy consisting essentially of about 52–57 weight percent mercury with the balance being lead and tin in a ratio of about 1:1, and the usual impurities, is the preferred composition. This composition has a melting point of about 110° F., is a solid of plastic consistency at room temperatures (20–25° C.) and may be easily cut into pieces of the desired size. Preferably, the amount of alloy used for a joint is about the same as the amount of solder on the joint. In use, the appropriate amount of alloy is placed on a joint the solder of which has just been melted, and the alloy and solder mixed with the tip of a soldering iron. The melted solder and alloy flow together and form a molten composition which passes slowly through an easily dislodged, rotten stage just as it solidifies. During this period, which is easily recognized even by an unskilled person, the composition can be brushed away by the user leaving the joined members substantially free of metal. Alternatively, and as the preferred method when small connections are involved, the mixture of alloy and solder is allowed to solidify and then pried or scraped off the surfaces of the members.

The mixture of alloy and solder, both in the rotten stage and when fully solidified, has a vastly reduced tendency relative to solder alone to adhere to surfaces with which it is in contact. Therefore, the mixture is easily removed from the members of the joint or from surrounding surfaces if spattering or dripping has occurred. A further advantage is that the solidified mixture is softer than solder, thus making the scraping action easier.

A still further advantage is that the mixture melts at a lower temperature than does solder alone so that the lower temperature required lessens the danger of burning delicate electronic parts or a printed circuit board. If insufficient alloy has been used so that the mixture is not completely released, it is necessary only to repeat the process with an additional piece of alloy. If more than the necessary amount has been used, no disadvantages are experienced, because the mixture will be soft and fragile and will not adhere to surfaces or coat copper parts with mercury.

While the alloy is a very useful solder removal aid in general, its use in printed circuits, particularly the miniature printed circuits in small radios, produces outstanding advantages in the saving of time and material. Printed circuits conventionally consist of a thin board or sheet of relatively rigid plastic or other nonconducting material on which transistors and other small electronic parts may be mounted in the construction of a pocket-size radio or other electronic device. In place of wires for connecting the various parts, the board has trails of conducting material printed on one surface thereof in preselected patterns. The electronic parts are then connected to the board and the printed conductors at desired locations by soldered connections. Conventionally, the part project from the unprinted surface of the board and have their leads and supporting arms passing through holes in the board to the printed surface where they are soldered to the printed conductors and to the board, respectively. If it is apparent that the loosening of these soldered connections, which may number six or more per part, by conventional techniques is a difficult procedure, if damage to the part, the board, and nearby printed conductors is to be avoided. Howeevr, it has been observed that persons unskilled in the use of a soldering iron can remove such parts easily, quickly, and without damage by following the procedure described above and in the examples below.

The amount of mercury in the alloy must be substantially within the range of 45 to 60%, preferably about 52–57%, as indicated heretofore; otherwise, some of the advantages in its use as a solder removal aid are lost. It has been found that as the relative amount of mercury is reduced, the resulting alloy rapidly loses its ability to keep the solder on a joint sufficiently soft, or rotten for a period which permits its easy removal. Also, the solidified mixture of alloy and solder approaches the hardness and adherent characteristics of solder alone and therefore is difficult to remove from the joint.

If the relative amount of mercury is increased above 60%, the resulting alloy will melt at a considerably lower temperature than will solder and will tend to run off the hot joint when placed thereon. The mixture of solder and alloy will, in effect, contain an "excess" of mercury which renders the mixture plastic after cooling and which produces a tendency to adhere to the parts of the joints. In addition, the plastic mixture will tend to adhere to and contaminate surrounding surfaces when it is being dislodged. Still further, the "excess" mercury in the alloy or in its solder mixture tends to coat any copper surfaces in contact therewith. This coating of mercury is very difficult to remove, and if not removed from pieces which are to be resoldered causes the later applied solder to loosen and separate from the copper. Actually, however, liquid mercury has been found to loosen solder when employed in the same manner as the alloy. The obvious difficulties in handling liquid mercury and its tendency to contaminate surrounding surfaces make its use impractical.

The ratio of tin to lead in the alloy of the invention may be varied between wide limits. However, it is preferred that the ratio be about 1:1 as the resulting alloy possesses a desirable combination of melting point, compatibility with conventional solder, duration of a rotten condition, and lack of adherence to adjacent surfaces when solidified thereon.

The alloy may be prepared by melting together the appropriate proportions of mercury, lead and tin in a suitable container which is inert toward the composition. Alternatively, the lead and tin in small pieces may be mixed with an excess of liquid mercury at room temperature and the resulting composition subjected to a filtering action under a pressure of several hundred pounds per square inch to free the mass of excess mercury. The resulting solid contains substantially the desired proportions of the three metals. Preferably, the composition is then formed into small pieces, such as pellets having a diameter of about 0.2 inch. Pellets of this size provide sufficient alloy for loosening a typical large soldered point between electronic parts. For smaller joints the pellet may be cut easily with a penknife into the desired size.

The alloy may advantageously be mixed with a conventional soldering flux, e.g., zinc chloride, before it is used. The resulting mixture melts and mixes with molten solder very rapidly and thus reduces the necessary heating time. In addition, the flux produces any oxides present in the mixture and forms a film over the joint being heated, thus increasing heat transfer between the joint and the soldering iron. The alloy is not readily mixed with flux at room temperature but it has been found that if the alloy is cooled until brittle, it may be ground into a powder and then easily mixed with flux. The mixture is then heated to about 100° F. and any excess flux observed on the surface thereof is removed with absorbent material. The resulting composition has the consistency of a thick paste and is easily applied to soldered joints.

Since mercury is toxic, reasonable precautions against absorption of the metal or its vapors into the body should be observed during use of the alloy and compositions containing same.

The following examples illustrate the preferred use of the alloy and will serve to augment the description set forth above.

Example 1

The following materials were placed in an inert container: 0.5 oz. lead, 0.5 oz. tin and 1.1 oz. mercury. The crucible was heated to about 450° F. and the resultant molten mass was thoroughly mixed. The molten material was then allowed to solidify at room temperature. The resulting composition containing 52.4% mercury was a solid plastic mass similar in appearance and consistency to dentists' amalgam.

A soldered joint between a lead from a resistor and a printed conductor on a printed circuit board was selected for loosening, and a piece of the above composition about equal to the amount of solder in the joint was separated from the mass with the top of a penknife. The board was positioned substantially horizontally with the joint facing upwardly and a heated soldering iron was applied to the joint to melt the solder. While the solder was in a molten condition, the separated piece of alloy was placed in contact therewith with forceps and the entire mass mixed with the tip of the heated soldering iron. The mass was allowed to solidify and was then easily pried loose from the board and from the resistor lead with the tip of the penknife. The lead and joint area of the board were found to be substantially free of solder but were brushed with a stiff brush in anticipation of resoldering the joint. No coating of mercury was observed on the copper lead.

The above joint was then resoldered by conventional technique and when observed several days later was found to be hard and tight.

Example 2

The procedure described in Example 1 was repeated using the following proportions: 0.5 oz. tin, 0.5 oz. lead, and 1.2 oz. mercury. The resulting composition containing 57.1% mercury was similar in appearance and consistency as the composition of Example 1. A soldered joint was loosened, cleaned and resoldered successfully following the step described in Example 1.

The invention herein is useful in removing any type of solder composition. Generally speaking, these solders comprise lead and tin in varying proportions, e.g., 1–2 parts tin per part of lead. In the foregoing examples a conventional lead solder comprising equal parts of lead and tin was used but other types of solder, particularly those containing lead and tin, with or without other constituents such as bismuth and antimony, may be removed equally as well.

Other modifications will also be apparent to those skilled in the art from the foregoing description of the invention. Hence the scope of the invention is set forth in the following claims.

What is claimed is:

1. A method of releasing solid tin-lead solder from surfaces to which it has adhered comprising: melting said solder in contact with an alloy containing from about 45 weight percent to about 60 weight percent mercury, the balance of the alloy consisting essentially of tin and lead with usual impurities, the amount of alloy present being sufficient to form with said solder a composition which when partially and wholly solidified is readily dislodged from said surfaces; mixing said alloy with said melted solder; and mechanically dislodging the resulting composition after it has at least partially solidified.

2. The method of claim 1 wherein said alloy contains about 52%–57% by weight of mercury.

3. The method of claim 1 wherein the weight ratio of tin to lead in said alloy is about 1 to 1.

4. The method of claim 1 wherein the amount of alloy employed is at least equal to about the amount of solder which is to be released.

5. The method of claim 1 wherein said resulting composition is dislodged from said surfaces before it has completely solidified.

6. The method of claim 1 wherein said resulting composition is dislodged from said surfaces after it has completely solidified.

7. The method of claim 1 wherein said alloy is added as a solid to said solder after the latter has been melted.

8. A method of releasing a joint on a printed circuit board which has been effected by a tin-lead solder, said method comprising: applying heat to said joint to melt said solder, adding to the molten solder a solid alloy containing from about 45 weight percent to about 60 weight percent mercury, the balance of the alloy consisting essentially of tin and lead with usual impurities, the amount of alloy added being sufficient to form with said solder a composition which when partially and completely solidified is readily dislodged from the joint; mixing said alloy with the molten solder; and mechanically dislodging the resulting solder-alloy composition from said joint after the composition has at least partially solidified.

9. The method of claim 8 wherein said alloy contains about 52%–57% by weight of mercury.

References Cited by the Examiner

UNITED STATES PATENTS

| 1,026,344 | 5/12 | Coolidge | 75—169 X |
|---|---|---|---|
| 1,357,297 | 11/20 | Newell | 148—24 |
| 1,363,332 | 12/20 | Lovegrove | 75—63 |
| 1,820,141 | 8/31 | Jessup | 75—169 |
| 1,959,668 | 5/34 | Gray | 75—169 |
| 2,136,496 | 11/38 | Epperson | 148—24 |
| 2,287,227 | 6/42 | Bowsher | 75—169 |
| 2,704,707 | 3/55 | Lemeshka | 75—169 |
| 2,735,050 | 2/56 | Armstrong | 29—504 X |
| 2,891,848 | 6/59 | Jaffe | 75—63 |

FOREIGN PATENTS 284  1865  Great Britain.

JOHN F. CAMPBELL, *Primary Examiner.*

MARCUS U. LYON, *Examiner.*